United States Patent [19]
Williams

[11] Patent Number: 5,768,600
[45] Date of Patent: Jun. 16, 1998

US005768600A

[54] METHOD FOR SUPPLYING DC POWER FROM A PC'S INTERNAL POWER SUPPLY TO ANY ASSOCIATED PERIPHERAL DEVICES

[75] Inventor: Marshall Williams, Fremont, Calif.

[73] Assignee: Unisys Corp, Blue Bell, Pa.

[21] Appl. No.: 976,185

[22] Filed: Nov. 21, 1997

Related U.S. Application Data

[63] Continuation of Ser. No. 412,801, Mar. 29, 1995, abandoned.

[51] Int. Cl.$^6$ .................................................. G06F 1/32
[52] U.S. Cl. .............................. 395/750.01; 364/492
[58] Field of Search ................. 395/750.01, 750.03, 395/75.08, 182.12, 182.2; 364/492, 709.01, 709.02

[56] References Cited

U.S. PATENT DOCUMENTS

| | | | |
|---|---|---|---|
| 4,782,355 | 11/1988 | Sakai et al. | 354/400 |
| 4,886,979 | 12/1989 | Chang | 307/11 |
| 5,226,540 | 7/1993 | Bradbury | 206/576 |
| 5,347,167 | 9/1994 | Singh | 307/125 |
| 5,404,542 | 4/1995 | Cheung | 395/750 |
| 5,506,790 | 4/1996 | Nguyen | 364/492 |

*Primary Examiner*—Ayaz R. Sheikh
*Assistant Examiner*—Ario Etienne
*Attorney, Agent, or Firm*—M. Starr; J. McCormack; N. Coss

[57] ABSTRACT

A method for adapting a computer unit array having an internal power supply for supplying an associated external peripheral unit with DC power from this power supply; wherein the computer unit is provided with a removable "power panel" secured in a sidewall and is made to comprise a metal strip provided with electrical terminals therein adapted for coupling to the power supply, and for so powering such a peripheral unit.

7 Claims, 5 Drawing Sheets

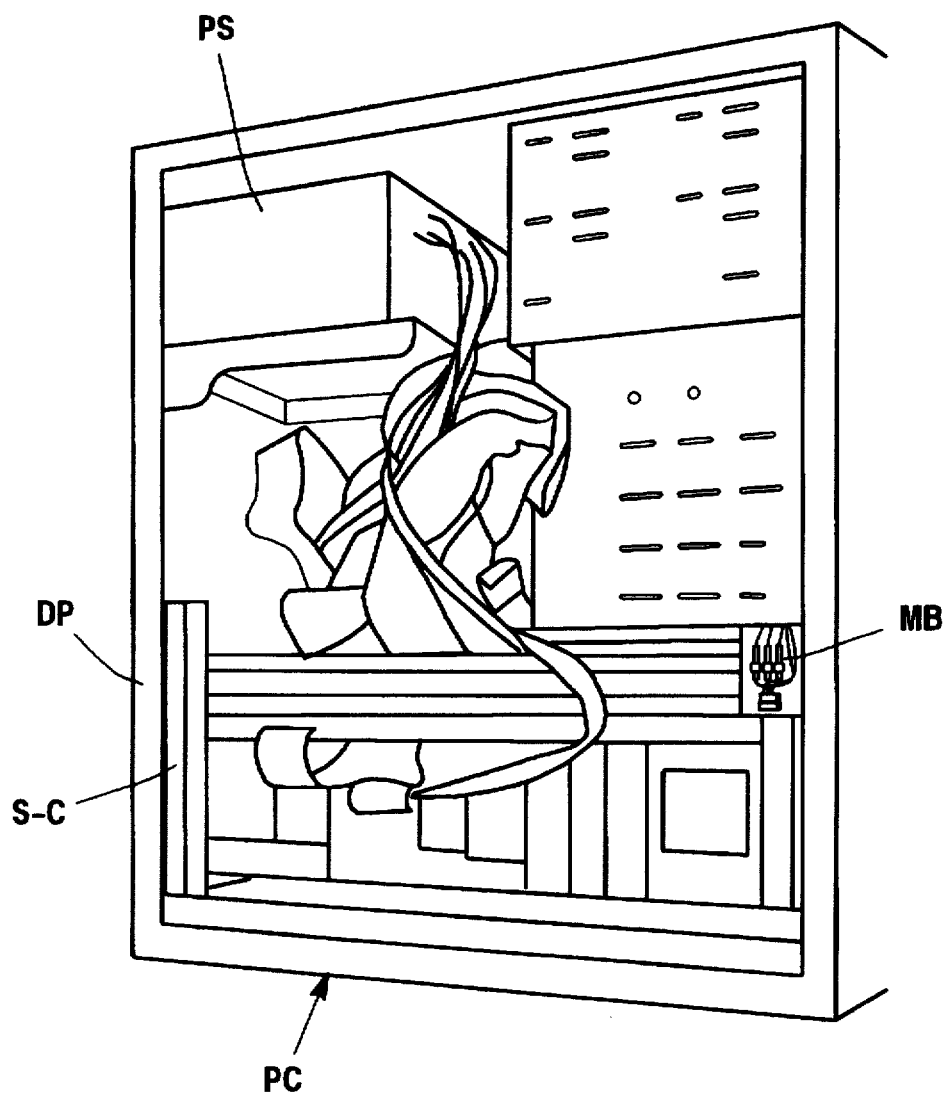
*Figure 1-C*
*Prior Art*

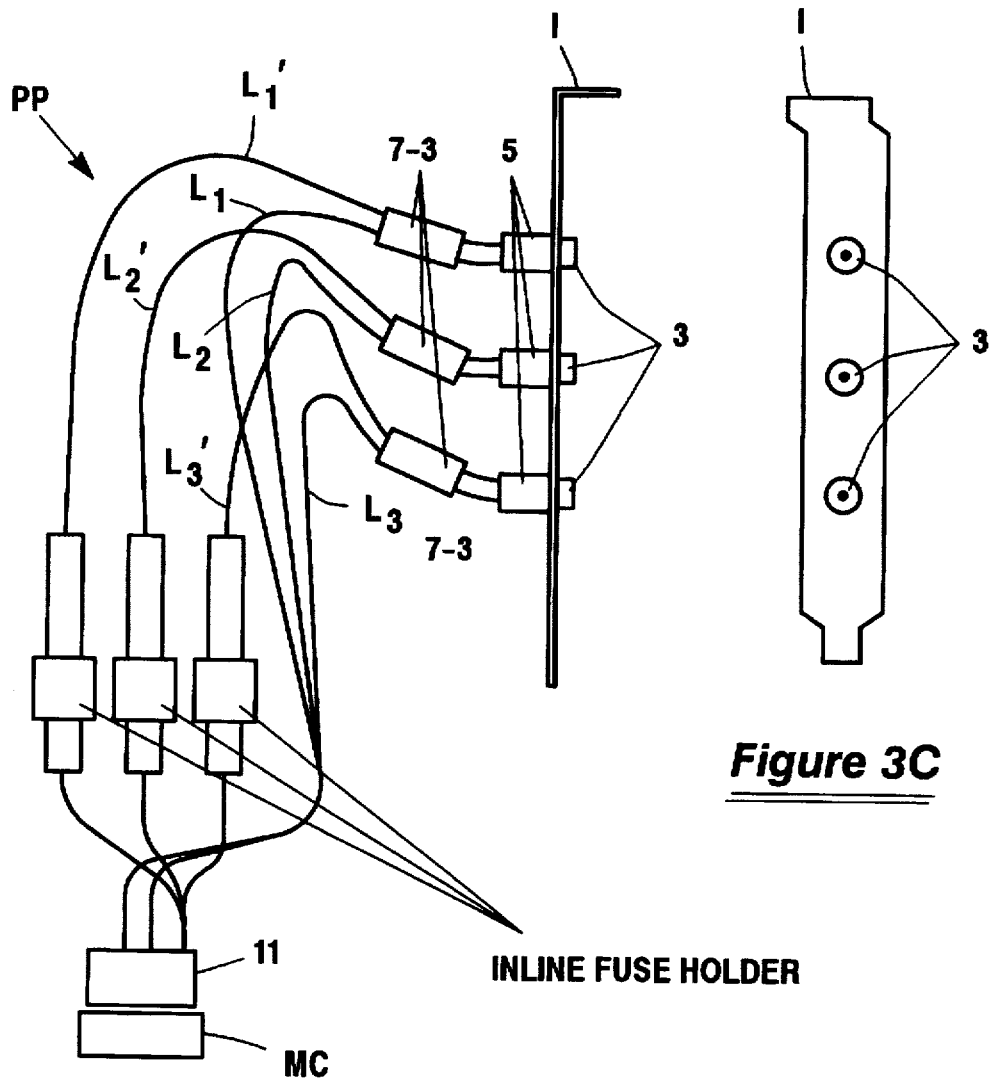
*Figure 3C*
*Figure 3A*
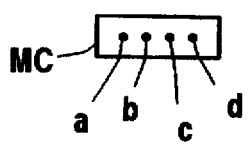
*Figure 3B*

1

METHOD FOR SUPPLYING DC POWER FROM A PC'S INTERNAL POWER SUPPLY TO ANY ASSOCIATED PERIPHERAL DEVICES

This application is a continuation of application Ser. No. 08/412,801, filed Mar. 29, 1995, now abandoned.

FIELD OF INVENTION

This invention relates to methods of using internal power developed within a computer unit for powering external units (e.g., a video camera), and to related intercoupling means.

BACKGROUND OF THE INVENTION

Artisans who are making or using a computer unit (e.g., a PC, or personal computer) realize there are difficulties in conveniently securing power for associated external auxiliary units, such as peripheral devices associated with a PC. One feature of this disclosure is to teach doing this by coupling internal (PC) power to such units, preferably doing so using a simple "Power Panel", e.g., using means already found in the typical Personal Computer. This Power Panel can supply low voltage D.C. power to PC peripheral devices without need for the usual power cord (or wall plugs with built-in transformers).

By this teaching, workers will realize, a single cord can supply AC power to the PC, while the PC then powers some (low power, external units) of its peripherals. And, in such cases a single power switch can be used to activate all these together (i.e., the internal power supply of the PC itself can be used to furnish low, DC Power to external equipment, such as a modem, etc.).

As a result, a PC user will need fewer AC power outlets or associated plugs, transformers, etc. This Power Panel will especially simplify power requirements for "international use", where the available line voltages are different, and/or where the needed AC power plugs/outlets/sockets (styles) are different. This Power Panel can, for instance, provide power for various exernal peripheral devices having differing voltage needs; e.g., +12 volts DC for a speaker phone, 9–12 VDC for a modem.

In a preferred embodiment this "Power Panel" can consist of a standard "auxiliary slot filler (ASF) panel" for a PC, with several male coaxial power connectors attached thereto (for this example three connectors are shown, see attached FIGS. 3, 4) plus standard connector lines. The power for these connectors comes from the PC's "switching power supply" via a spare "drive power connector". This is achieved using a matching male power connector and having the appropriate pins wired through this "ASF panel".

Preferably, these connections are made via protecting fuses and EMI filter means (to minimize the transmission of EMI, Electromagnetic Interference). The fuses will protect both the power supply and the peripheral device from an overcurrent condition.

The output of such EMI filters can then (each) be wired to a respective coaxial power connector. The EMI filters can be as simple as a hollow ferrite bead or toroid, or as complex and sophisticated as an LC filter.

And, where the PC motherboard supports +3.3 volts, then it (the motherboard) can be routed to this Power Panel via the proper connector combination (e.g., for external peripheral unit needing 3–4 VDC).

Thus, it is a general object here to teach how to provide/ use such a "Power Panel" to supply low-moderate DC power to external equipment from a computer unit. A more particular object is to do this using an "auxiliary filler panel". Another object is to do so in a PC, and by way of more simply, conveniently providing various power levels to external equipment.

A more general object hereof is to address at least some of the foregoing problems and to provide at least some of the mentioned, and other, advantages.

BRIEF DESCRIPTION OF THE DRAWINGS

These and other features and advantages of the present invention will be appreciated by workers as they become better understood by reference to the following detailed description of the present preferred embodiments which should be considered in conjunction with the accompanying drawings, wherein like reference symbols denote like elements:

FIG. 1C is a simplified top schematic view of a portion of an exemplary generalized PC; while

FIG. 2 is a plan-side view of a panel embodiment, while FIG. 3A is a schematic side view of the preferred "Power Panel" embodiment of FIG. 1, with a front elevation of plate 1C thereof in FIG. 3C; and an end view of the connector MC therefor in FIG. 3B.

DESCRIPTION OF THE PREFERRED EMBODIMENT

Before giving more details of the subject "Power Panel" embodiment, it will help to indicate an exemplary use environment in which such an embodiment can be employed. Such will now be very briefly summarized. The methods and means discussed herein, will generally be understood as constructed and operating as presently known in the art, except where otherwise specified; likewise all materials, methods, devices and apparatus described herein will be understood as implemented by known expedients according to present good practice.

Figure 1A:
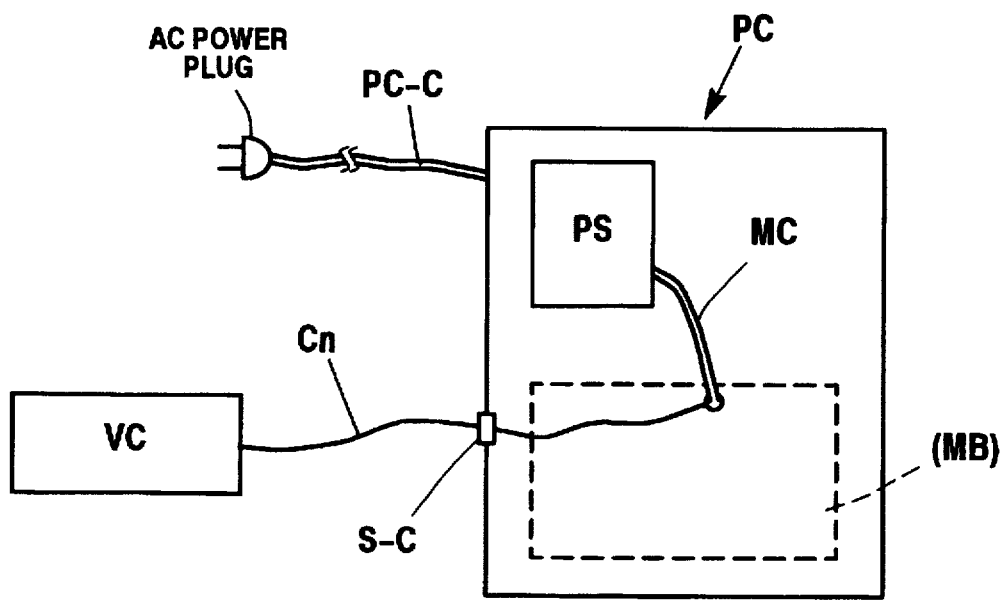
FIG. 1A is a like view of such a PC having an "filler panel" 1 in place (Power Panel assembly) for connecting between the PC power supply and an external device.

Thus, FIG. 1C is a simplified upper isometric of portions inside a generalized personal computer PC from which various DC power levels may be brought to an external peripheral unit PU-1 which may for instance be a video camera unit VC—e.g., see FIG. 1A. Workers will note that PC includes a power supply stage PS, a motherboard MB and daughterboard DB affixed thereon, and presenting output-connector means through an adjacent sidewall S-C in the PC (see S-C also in FIG. 1B, etc.).

The need here addressed is to avoid (where possible) the need for a separate power cord (or like conductor) for external auxiliary units that typically are used with a PC—e.g., such as a video camera VC in FIG. 1A, computer PC has a conventional power cord-transformer combination PC-C to be plugged-into the usual 115 AC or 220 AC wall socket (FIG. 1A). A feature here is that the PC power supply can be used also as a source of DC-power, and that serves to convert this to video-camera-power; typically 9–12 VDC for an external unit like VC. As workers will know, it is often inconvenient—at times near impossible—to match a peripheral's power cord to the available wall socket styles (e.g., in foreign countries), and to make them long enough to reach a wall socket (e.g., often creating a cord-tangle across the floor). Thus, it would often be much simpler and more convenient to simply use "internal PC-power" for such auxiliary units, thus standardizing on one short power line PC-C to the PC (and using a switch to adapt to 115 AC or 220 AC). It is a feature hereof to do this, e.g., using moderate-DC-power levels typically available from a PC Power supply (e.g., ±12 VDC, ±5 VDC, from Power supply PS for PC in FIGS. 1).

A related object is to do so, using a convenient, inexpensive, intra-PC coupling means, such as the filler plate 1 of FIGS. 1–3, as there modified and connected, etc. In such cases, one is, of course, limited to empowering external auxiliary units which require low-to-moderate DC power.

FIG. 1A very schematically shows such a PC (with power supply PS with the usual power cord PC-C and plug for connection to the usual AC-power outlet (i.e., wall plug, as depicted). A feature hereof is that the PC power supply PS is also arranged to provide moderate-voltage DC power to (one or several) external peripheral devices, such as the depicted video camera VC, doing so by inter-connecting the peripheral (e.g., via its connector cn) and PC inter connector means (such as drive power connectors MC) via a "filler panel" 1 or like terminal plate 1, mounted on sidewall S-C.

A preferred such panel 1 is depicted in FIGS 2, 3, and is adapted to be attached to sidewall S-C so as to span a slit, or aperture, therethrough—such as a slit SL (e.g., FIG. 1-B) as known in the art (e.g., for presenting daughter board terminals or the like for external use.

Figures 2A, 2B:
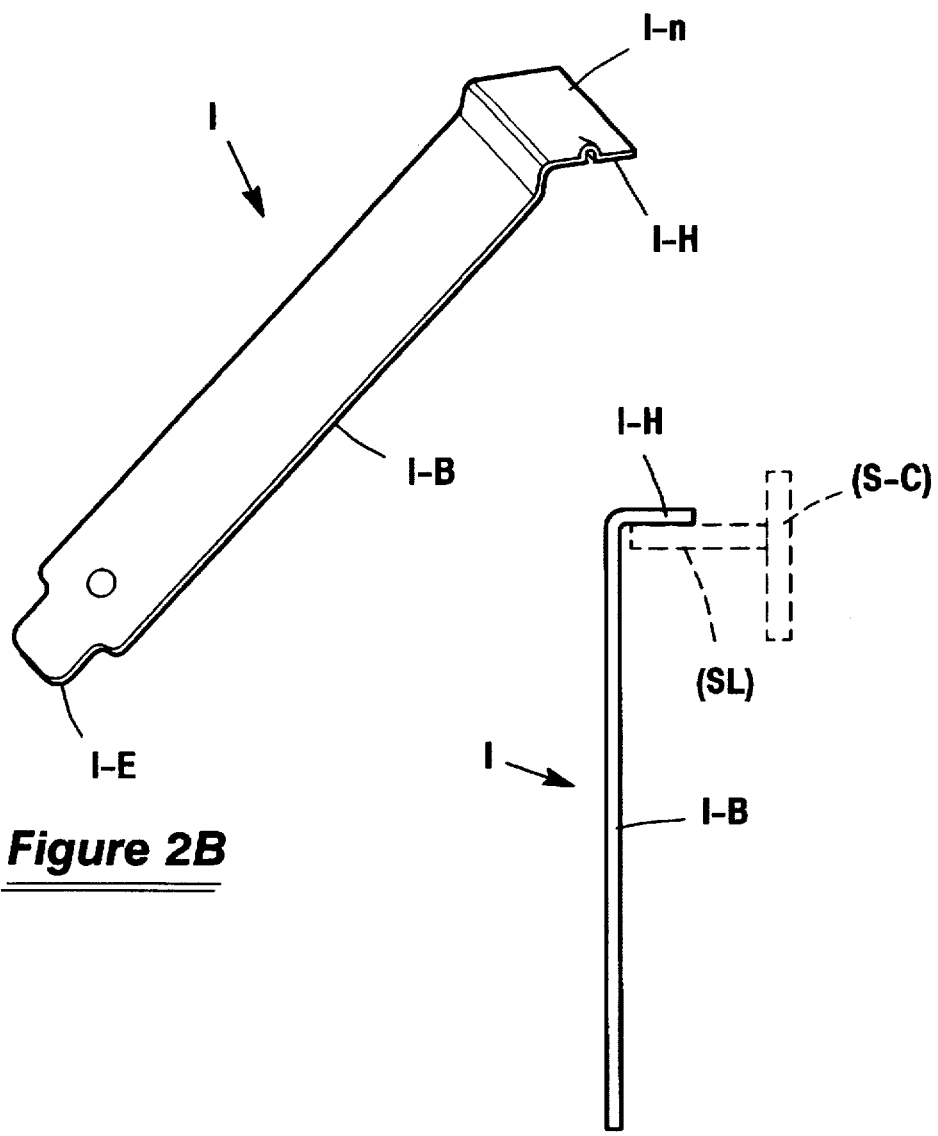
FIG. 2A is a side view thereof.

FIGS. 2, 2A show a "filler panel" 1, adapted to be affixed on a receiving "shelf" sh projected inside sidewall S-C, and serve as a mount for connection to a peripheral conductor (e.g., cn, FIG. 1A) and for related PC power lines (e.g., MC, FIG. 1A)—especially for electrical plug-in connectors mounted (for connection with external leads, as known in the art). It will be understood that such a plate 1 is also preferably adapted to be secured to the subject PC sidewall S-C—e.g., by removable threaded securement onto a sidewall flange, or shelf SH, e.g., via a screw fitted into a slit 1-n across the head 1-H of the plate 1.

Such a panel 1 may also be understood as provided to close such slots S-L in such a sidewall, e.g., to regulate and block air-flow within the PC from escaping out the slot, and to block passage of electromagnetic radiation, while also enhancing the aesthetic appearance of the sidewall. Thus, a raw "panel" 1 will be understood to preferably comprise a thin, flat rectangular mid-section 1-B (FIGS. 2, 2A) with a tip 1-F at one end and a head portion 1-H at the other. The head 1-H will typically be "offset" and include a transverse flange into which a notch 1-n is provided for shelf-securement via a screw.

FIG. 3A is an enlarged view of the "power panel assembly" PP including such a "filler plate" 1, modified, according to an embodiment hereof, to serve as a "Power Panel", according to the invention; while FIG. 3B is an end-view of a connector thereto and FIG. 3C is a frontal elevation of filler plate 1, so modified.

Here, it will be understood that the purpose of this "Power Panel" is to provide a means of supplying low voltage power to (one or more) PC peripheral devices, without the need for a conventional plug-in peripheral power supply (or plug-in wall transformers) therefor. An advantage is that a single AC cord (from the usual wall outlet) can then supply power to the PC which can, in turn, empower its peripherals; also a single power switch can be used to turn-on everything at once. The PC power unit will typically output various DC voltages useful for this. Thus, one will need fewer AC power outlets (for peripherals). This Power Panel will simplify power-connection and like requirements, especially in international situations; e.g., where the line voltages are different, as are the types of AC power outlets and plugs.

Here, a Power Panel assembly PP (FIG. 3) preferably consists of a "slot filler panel" 1, with several male coaxial power connector terminals 3 attached (coming from the PC switching power supply—for this example three connectors are shown, see FIGS. 3A, 3B, 3C); plus suitable connectors to desired intra-PC power levels.

Workers will recognize that filler panel 1 is preferably secured at its top onto a receiving shelf SH via a screw/washer, and is cut-out to admit connector terminals—as at 3.

Thus, filler panel 1 will be secured to connector terminals 3 to form a "Power Panel" assembly PP, which may, in turn, be secured to the interface of a PC sidewall, e.g. by a compression-screw into a receiving shelf (sh, FIG. 2A, and see notch 1-N for accommodating such a compression screw), leaving terminals 3 to protrude outwardly of the plate and the PC sidewall (as in FIG. 3A). Also panel 1 in FIGS. 3B, 3C, 3A preferably has its head "offset", has a bottom hole, and a tapered tip 1-E.

The power for these connectors comes from the PC's "switching power supply" (PS in FIG. 1–2) via a spare "drive power connector" MC and intercoupling conductors L (see $L_1, L_2, L_3$ and $L_1', L_2', L_3'$ FIG. 3A), with intermediate female connector 11. This is achieved using a matching male power connector 5 connecting "hot" lines L' to terminals 3; preferably, via filters 8, the appropriate "hot" pins being wired to fuses 9 for overload protection, with the other side of the fuses wired connector MC. Ground lines L are also run through filter 8, suitable for minimizing the transmission of Electromagnetic Interference (EMI) to the coaxial power connectors 5. The output of lines L,L' is thus taken to the coaxial power connectors 3.

The EMI filters can be as simple as a hollow ferrite bead, or a toroid (inductor) or as complex and sophisticated as an LC filter (filter device with inductance-capacitance). The fuses will protect both the power supply and the peripheral device from an "overcurrent" condition.

This assembly (FIG. 3A) will, here, be understood as intended to supply +12 VDC (e.g., for an auxiliary video camera VC or speaker phone unit) external to the PC via male connectors 3 (+12 VDC at center pin, FIG. 3C), ground at outer shell (each connector 3 plugged-into 5-3), with end-pin "a" of connector MC carrying +12 VDC, while end-pin d carries +5 VDC. For this, connector 11 ties all +12 VDC leads L' together, each to be "fused" enroute to its connector 3; e.g., with standard fuse-holders 9, for standard 3AG, ¼×1¼" fuses, or the like: Ground lines L are connected to the two center-pins b, c of connector MC (and one is doubled), each being threaded through a respective ferrite filter bead 7-3, with a respective hot line L', as known in the art—thence, to the outer shell of connectors 3.

Of course, other "moderate-level" DC voltages may be so-provided; e.g., +5–6 VDC (e.g., for a disk drive or speaker), or 9–12 VDC (e.g., for a modem or a graphics tablet), or 3–4 VDC (e.g., for PCMCIA).

Power Supply Within Computer

Workers recognize that virtually all intra-PC computer circuits now use "low-voltage" direct current; thus, their power supply stage must deliver this by converting commonly available AC power (e.g., 115 VAC or 225 VAC, and 60 Hz; e.g., vs. 230 VAC, 50-Hz in Europe). Here, we will assume a commonly-available "switching" power supply (e.g., vs. a "linear" power supply—e.g., commonly converting frequency such as 60 Hz utility power to high-frequency pulses, with pulse-width modulation), with voltage reduced, rectified and filtered. Some power supplies will also automatically adjust for the prevailing AC input voltage and frequency. Connectors form the PC power supply may be adapted to go to the motherboard and to tape/disk drive units.

Alternatives

If the PC power supply has no spare "drive connectors" MC, an alternative method for providing different levels of peripheral DC power is to use a male power connector wired to a female power connector as a "passthrough". This combination will be understood as installed in series with an existing drive power source in the PC and would therefore not require a separate "drive power connector". The required power for the Power Panel would then, of course, be tapped from the wires between the male and female power connectors.

Yet another implementation is to provide for −12 volts or −5 volts by using the above "passthrough" method, but using a motherboard power connector (not shown) rather than a drive power connector MC.

If the motherboard supports +3.3 volts then this voltage could also be routed to the Power Panel, via an appropriate power connector combination.

If more than one voltage (or current) is supplied to the Power Panel, then the coaxial power connectors should be "keyed" in some fashion (e.g., by connector-size: large male connectors for low V, smaller for high V, so that one cannot couple high V to low V device). Such connectors are available in a variety of sizes and one can take advantage of this. In this case, the higher voltages would use "smaller diameter" connectors insuring that a "lower-voltage-peripheral" couldn't be plugged-into a higher voltage male socket.

Figure 1B:
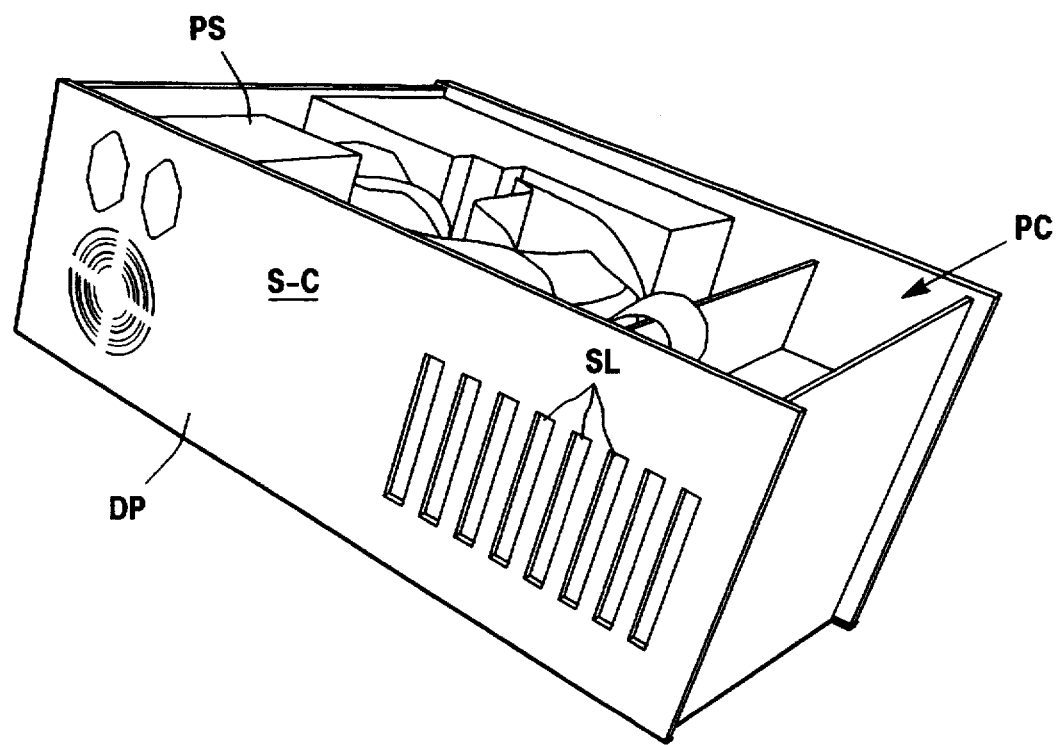
FIG. 1B is a side view of the PC.

Alternatively, one can modify a standard "D-connector filler plate" (substituting for plate 1 above) and place it in a standard D-connector slot (e.g., see FIG. 1B, and panels D-P, D-P', which are 1", 3" long respectively).

Or, one could use a "card-slot" (e.g., see motherboard MB to FIG. 1C; e.g., Motherboard understood as already having connectors/pins, connected to PS, carrying some/all voltages of PS: with pins carrying +5,−5,+12,−12 VDC). For example TABLE I below gives exemplary DC voltages on specific pin positions:

TABLE I

| For PCI Slot: | |
|---|---|
| +5 VDC on pins: | A-5, -8, -10, -16, -59, -61, -62 |
| | and on B-5, -6, -19, -59, -61, -62 |
| +12 on | A-2 |
| −5 on | |
| −12 on | B-1 |
| Gnd on | A-12, -13, -18, -24, -30, -35, -37, -42, -48, -56 |
| | and on B-3, -12, -13, -15, -17, -22, -28, -34, -38, -46, -49, -57 |
| +3.3 on | A-21, -27, -33, -39, -45, -53 |
| | and on B-25, -31, -36, -41, -43, -54 |
| For ISA Slot: | |
| +5 VAC on pins: | B-3, -29 and D-16 |
| +12 on | B-9 |
| −12 on | B-7 |
| −5 on | B-5 |
| Gnd on | B-1, -10, -31, and D-18 |

Where there is no "filler-plate opening" available in a PC sidewall, workers will understand that a suitable opening can be made, and a suitable "Power Panel" fashioned therefor. For instance, workers will recognize such utility for some D-connector "knock-out panels" e.g., note D, D' FIG. 1B, where respective large small D-connectors are installed in such sites, the knock-out panels having been removed).

Otherwise, one can simply cut a rectangular opening slightly larger than the coaxial power connector (see 5 in FIGS. 1–2) and fashion a Power Panel (plate) therefor and attach the Panel.

In conclusion, it will be understood that the preferred embodiments described herein are only exemplary, and that the invention is capable of many modifications and variations in construction, arrangement and use without departing from the spirit of the claims.

For example, the means and method disclosed herein are also applicable to other related power distribution schemes. Also, the present invention is applicable for so using the internal power of other host arrangements.

The above examples of possible variations of the present invention are merely illustrative. Accordingly, the present invention is to be considered as including all possible modifications and variations coming within the scope of the invention as defined by the appended claims.

What is claimed is:

1. A method of adapting a computer array including a personal computer unit having internal power supply means therein plus sidewall means for supplying any associated external peripheral means with DC power from said internal power supply means, the personal computer unit being dedicated to no particular ones of said any associated external peripheral means, wherein, for each said any associated external peripheral means, said sidewall means is provided with a removable "power panel" means secured in the sidewall means and comprising a metal strip provided with electrical terminal means, and wherein electrical conductor means are coupled between said electrical terminal means and said internal power supply means, for so powering said any associated external peripheral means connected to said electrical terminal means; and wherein each of said any associated external peripheral is so connected to said internal power supply means via EMI filter means and via associated fuse means.

2. The invention of claim 1, wherein each said EMI fiter means comprises a hollow ferrite bead or toroid means.

3. The invention of claim 1, wherein each said EMI filter means comprises an LC filter.

4. The invention of claim 1, wherein at least one of said conductor means to a said terminal means is taken from said power supply means via PC circuit board means.

5. A method of providing DC "peripheral power" from a personal computer (PC) unit having internal power supply means therein to external peripheral means; said PC unit having sidewall means; said method comprising: providing one or more connect-slots through said sidewall means for accommodating connector-strips therein; removably securing one or more "connecior-strips", one in each said one or more connect slot, for securement of out-leading electrical connectors; while also adapting each such connector-strip to receive and mount power leads from said internal power supply means to thereby present intra-computer DC power to one or more said external peripheral means; wherein each said connector strip is coupled to said internal power supply means via one or more "drive power connectors", and includes one or more peripheral electrical terminals adapted for connection to a respective peripheral unit; and wherein each said peripheral electrical terminal is so connected to said internal power supply means via EMI filter means and via associated fuse means.

6. The method of claim 5, wherein each said EMI filter means comprises a hollow ferrite bead or toroid means.

7. The method of claim 5, wherein each said EMI filter means comprises an LC filter.

* * * * *